United States Patent
Asai et al.

(10) Patent No.: US 7,588,851 B2
(45) Date of Patent: Sep. 15, 2009

(54) FUEL CELL STACK STRUCTURE

(75) Inventors: Yasuyuki Asai, Toyota (JP); Toshiyuki Suzuki, Toyota (JP); Tsuyoshi Takahashi, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 414 days.

(21) Appl. No.: 10/435,388

(22) Filed: May 12, 2003

(65) Prior Publication Data

US 2003/0215693 A1 Nov. 20, 2003

(30) Foreign Application Priority Data

May 20, 2002 (JP) .............................. 2002-144934

(51) Int. Cl.
*H01M 2/00* (2006.01)
(52) U.S. Cl. ....................................................... 429/34
(58) Field of Classification Search .................... 429/34
See application file for complete search history.

(56) References Cited

U.S. PATENT DOCUMENTS

| 6,051,331 | A  | * | 4/2000  | Spear et al.    | 429/34 |
| 6,322,919 | B1 | * | 11/2001 | Yang et al.     | 429/34 |
| 6,869,717 | B2 | * | 3/2005  | Cargnelli et al.| 429/34 |
| 2002/0022173 | A1 | * | 2/2002 | Molter et al.   | 429/37 |
| 2002/0081477 | A1 | * | 6/2002 | McLean et al.   | 429/34 |
| 2002/0127463 | A1 | * | 9/2002 | Sugita et al.   | 429/38 |
| 2003/0194596 | A1 | * | 10/2003| Ye et al.       | 429/38 |

FOREIGN PATENT DOCUMENTS

| CA | 2 399 938 | 8/2001 |
| EP | 0 951 086 B1 | 1/2005 |
| JP | 06089730 A | 3/1994 |
| JP | 08329959 A | 12/1996 |
| JP | 09-120833 | 5/1997 |
| JP | 10-228918 A | 8/1998 |
| JP | 2000-067890 | * 3/2000 |

(Continued)

OTHER PUBLICATIONS

Japanese Official Communication, JP 2002-144934, issued Aug. 15, 2005.

(Continued)

*Primary Examiner*—Patrick Ryan
*Assistant Examiner*—Cynthia Lee
(74) *Attorney, Agent, or Firm*—Kenyon & Kenyon LLP

(57) ABSTRACT

The invention relates to a fuel cell stack structure capable of suppressing a drop in voltage resulting from flooding or contamination at an end in a direction in which cells are laminated, particularly in a cell at a gas outlet/inlet end. In this fuel cell stack structure, a layer which is irrelevant to power generation and in which a gas flow channel is formed is provided at least at a gas outlet/inlet end of a laminated-cell body of a fuel cell such as a solid-polyelectrolyte fuel cell. The layer is constructed of a dummy cell having a gas flow channel but no MEA. In addition, according to this fuel cell stack structure, both a fuel gas flow channel and an oxidative gas flow channel are formed in one face of the layer which is irrelevant to power generation and in which the gas flow channels are formed.

14 Claims, 5 Drawing Sheets

FOREIGN PATENT DOCUMENTS

| | | |
|---|---|---|
| JP | 2001006718 A | 1/2001 |
| JP | 2001-236975 A | 8/2001 |
| JP | 2003-523057 A | 7/2003 |
| WO | WO 00/36680 | 6/2000 |

OTHER PUBLICATIONS

English Translation of Japanese Official Communication, JP 2002-144934, issued Aug. 15, 2005.

Canadian Office Action for Patent Application No. 2,428,959 issued on Nov. 22, 2006.

German Language Version of German Office Action for Application No. 10322537.4 issued Oct. 12. 2006.

English Translation of German Office Action for Application No. 10322537.4 issued Oct. 12, 2006.

Canadian Office Action, Appln. No. 2,428,959 issued Jul. 10, 2007.

Japanese Language Version of Written Opinion, Appln. No. PCT/JP2006/301813 issued Mar. 13, 2007.

* cited by examiner

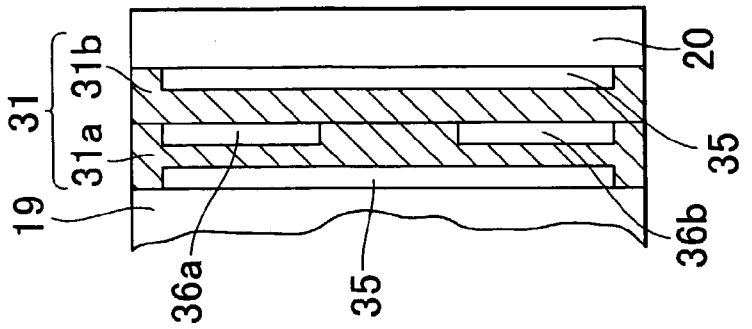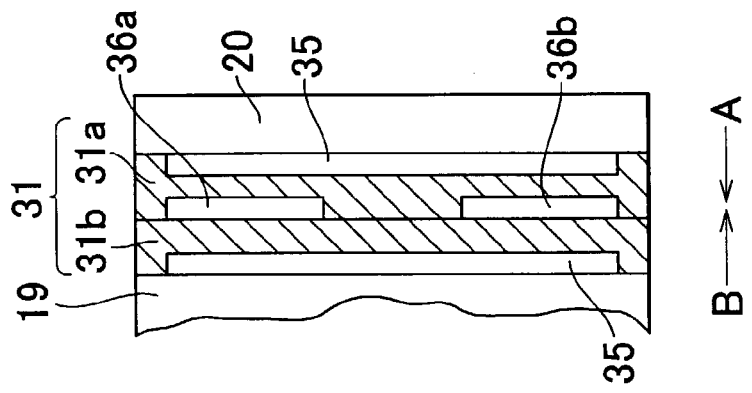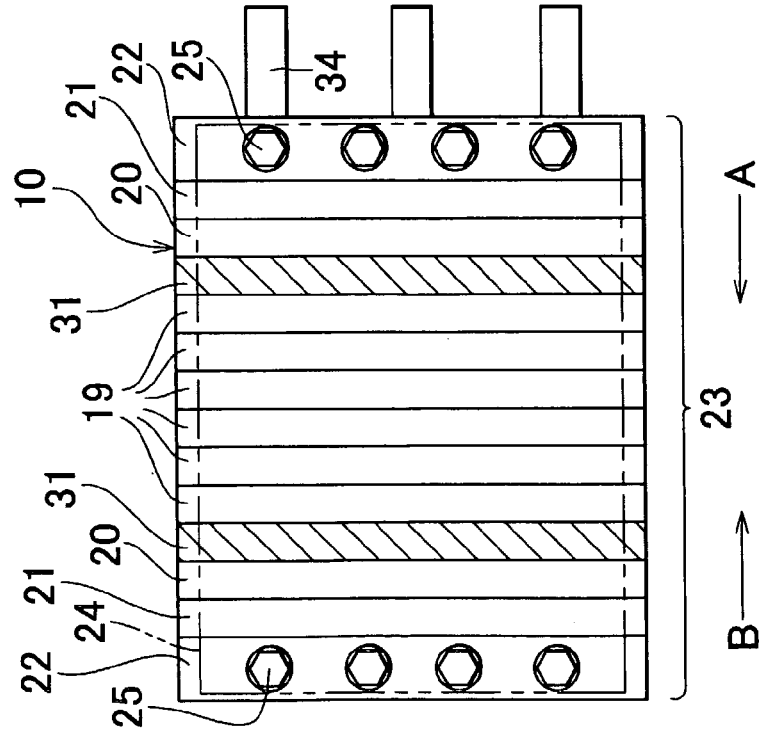

FUEL CELL STACK STRUCTURE

INCORPORATION BY REFERENCE

The disclosure of Japanese Patent Application No. 2002-144934 filed on May 20, 2002 including the specification, drawings and abstract is incorporated herein by reference in its entirety.

BACKGROUND OF THE INVENTION

1. Field of the Invention

The invention relates to a fuel cell stack structure and, more particularly, to a solid-polyelectrolyte fuel cell (PEMFC) stack structure.

2. Description of the Related Art

A solid-polyelectrolyte fuel cell is constructed by laminating membrane-electrode assemblies (MEA's) and separators. Each of the MEA's is composed of an electrode membrane made of an ion exchange membrane, an electrode (anode or fuel pole) made of a catalytic layer disposed on one face of the electrode membrane, and an electrode (cathode or air pole) made of a catalytic layer disposed on the other face of the electrode membrane. Each of the separators has a fluid passage for supplying the anode and cathode of a corresponding one of the MEA's with fuel gas (hydrogen) and oxidative gas (oxygen, usually air) respectively. Each of the separators also has a coolant flow channel through which coolant flows. A diffusion layer is interposed between each of the MEA's and a corresponding one of the separators. One or more cells are laminated to constitute a module. The same modules as this one are laminated to constitute a module group. A terminal, an insulator, and an end plate are disposed on either side of the module group in a directions in which the cells are laminated (hereinafter referred to as a cell-lamination direction). A laminated-cell body thus constructed is fastened in the cell-lamination direction. The laminated-cell body is fixed on its outside by a fastening member (e.g., a tension plate, a tension bolt, or the like), whereby a stack is constructed.

On the anode side of the solid-polyelectrolyte fuel cell, a reaction of turning one hydrogen molecule into two hydrogen ions and two electrons occurs, and the hydrogen ions move through an electrolytic membrane toward the cathode side. On the cathode side of the solid-polyelectrolyte fuel cell, a reaction of producing two water molecules from four hydrogen ions, four electrons, and one oxygen molecule (the electrons produced in the anode of an adjacent one of the MEA's penetrate a corresponding one of the separators, or the electrons produced in the anode of a cell on one end of the laminated-cell body flow to the cathode of a cell on the other end of the laminated-cell body through an external circuit) occurs.

Anode Side: $H_2 \rightarrow 2H^+ + 2e^-$
Cathode Side: $2H^+ + 2e^- + (1/2)O_2 \rightarrow H_2O$ In order for hydrogen ions to move through the electrolytic membrane, it is required that the electrolytic membrane be suitably wet. In addition to humidifying gas appropriately and supplying it to the laminated-cell body, water produced by power-generating reactions mentioned above is utilized to keep the electrolytic membrane wet. However, if the electrolytic membrane becomes excessively wet, water pockets (flooding) are created in gas flow channels. This causes a decrease in output of the fuel cell.

According to a procedure proposed in Japanese Patent Application Laid-Open No. 2001-236975, a bypass flow channel for gases irrelevant to power generation is formed in a deep end portion of a fuel cell stack, produced water that has flown through this bypass flow channel to stay in a gas manifold on the gas outlet/inlet side is extruded, and the occurrence of inconveniences resulting from the produced water is restrained.

However, the fuel cell stack of the related art has a problem, namely, a drop in the voltage of end cells during power generation. This problem is caused mainly because of the following reasons. The first one (1) consists in that condensate and impurities (metal ions contained in a system and the like) tend to mix with the end cells, that flooding or contamination is thus caused, and that cell voltages are decreased as a result. The second one (2) consists in that the end portions are susceptible to external heat and thus tend to be cooled, and that flooding occurs as a result.

Even if the bypass flow channel for gases is formed in the deep end at the outlet or inlet of the stack as disclosed in Japanese Patent Application Laid-Open No. 2001-236975, a drop in voltage in those cells at the gas outlet/inlet ends is inevitable. Especially in the cells at the gas outlet/inlet ends, inconveniences are likely to be caused by impurities that have mixed with gas. These inconveniences cannot be eliminated by the aforementioned related art. In addition, there is caused another problem, which is the occurrence of flooding based on the fact that the cells at the gas outlet/inlet ends tend to be cooled. This problem cannot be solved either.

It is an object of the invention to provide a fuel cell stack structure capable of suppressing a drop in voltage resulting from flooding or contamination in end portions in the cell-lamination direction, particularly, in the cells at the gas outlet/inlet ends.

SUMMARY OF THE INVENTION

According to one aspect of the invention for achieving the object stated above, there is provided a fuel cell stack structure that is characterized by having a laminated-cell body constructed by laminating a predetermined number of fuel cells and a gas flow channel layer which is provided at a gas outlet/inlet end of the laminated-cell body and which includes a gas flow channel formed in the direction of a plane of the gas flow channel layer.

In this arrangement, since the layer in which the gas flow channel is formed is provided at least at the gas outlet/inlet end, it is possible to restrain the occurrence of a drop in voltage resulting from flooding by water or contamination by impurities at an end in the cell-lamination direction, especially in a cell at the gas outlet/inlet end. In addition, the influence of external temperatures (low temperatures) can be lessened, and condensation of water and flooding can be suppressed.

In addition, the gas flow channel layer is irrelevant to power generation of the fuel cell. Further, the fuel cell is a solid-polyelectrolyte fuel cell. Still further, the gas flow channel layer is a dummy cell layer having no MEA.

The gas flow channel layer is provided at either end of the laminated-cell body. In this arrangement, since the layer in which the gas flow channel is formed is provided at either end of the laminated-cell body, it is possible to restrain a drop in voltage resulting from flooding or contamination at either end in the cell-lamination direction.

Still further, the gas flow channel layer is composed of a plurality of layers.

Furthermore, both a fuel gas flow channel and an oxidative gas flow channel are formed in one face of the gas flow channel layer. In this arrangement, since both the fuel gas flow channel and the oxidative gas flow channel are formed in one face, the thickness of the layer can be reduced in comparison with a case where the gas flow channels are formed in two faces.

Furthermore, the fuel gas flow channel and the oxidative gas flow channel are formed in the direction of a plane of the gas flow channel layer. Also, a coolant flow channel is formed in one face of the gas flow channel layer. Further, the gas flow channel layer is conductive. Still further, the gas flow channel layer is made of carbon.

BRIEF DESCRIPTION OF THE DRAWINGS

FIG. 6A is a side view of the fuel cell stack structure of the embodiment. FIG. 6B is a side view of a layer irrelevant to power generation and a region in the vicinity of the layer. FIG. 6C is a side view of another layer different from the one shown in FIG. 6B and a region in the vicinity of the layer.

DETAILED DESCRIPTION OF PREFERRED EMBODIMENT

The fuel cell stack structure of the invention will be described hereinafter with reference to FIGS. 1 to 7.

One example of fuel cells to which gas flow channels in accordance with the invention are applied is a solid-polyelectrolyte fuel cell 10. The fuel cell 10 is mounted, for example, in a fuel cell powered vehicle. It is also appropriate, however, that the fuel cell be mounted in a non-vehicular object.

Figure 7:
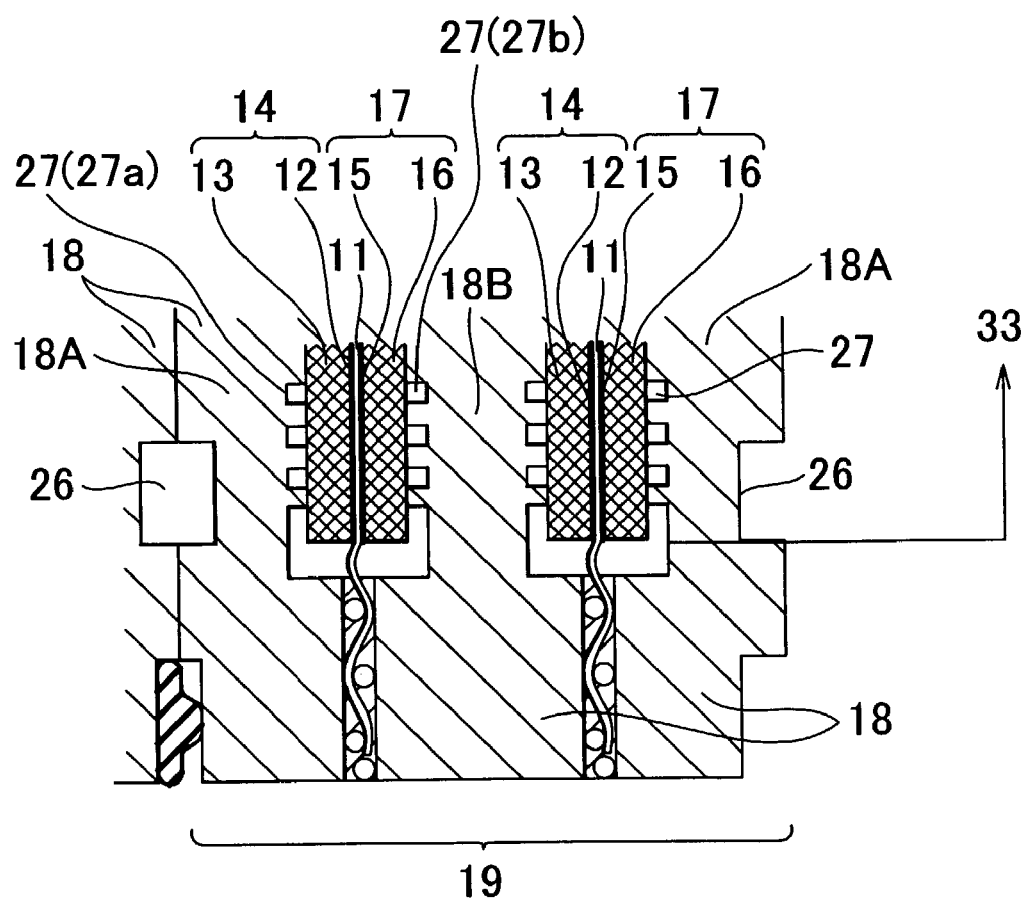
FIG. 7 is an enlarged cross-sectional view of a region in the vicinity of the fuel cell shown in FIG. 6A.

As is apparent from FIGS. 6 and 7, the solid-polyelectrolyte fuel cell 10 is constructed of a laminated body that is composed of membrane-electrode assemblies (MEA's) and separators. Each of the MEA's is composed of an electrolytic membrane 11 made of an ion exchange membrane, an electrode 14 (anode or fuel pole) made of a catalytic layer 12 and a diffusion layer 13, and an electrode 17 (cathode or air pole) made of a catalytic layer 15 and a diffusion layer 16. The catalytic layer 12 is disposed on one face of the electrolytic membrane 11, while the catalytic layer 15 is disposed on the other face of the electrolytic membrane 11. Gas flow channels (a fuel gas flow channel 27a and an oxidative gas flow channel 27b) for supplying electrodes 14, 17 with fuel gas (hydrogen) and oxidative gas (oxygen, usually air) respectively and a coolant flow channel 26 through which coolant for cooling the fuel cell flows are formed in each of separators 18. One of the MEA's is superimposed on one of the separators 18 so as to form a cell. At least one of cells like this one is laminated to constitute a module 19 (e.g., two cells are made into one module). The same modules 19 as this one are laminated to constitute a laminated-cell body. A layer 31 that is irrelevant to power generation as will be described later is disposed at least at a gas outlet/inlet end or either end of the laminated-cell body. A terminal 20, an insulator 21, and an end plate 22 are disposed at either side of the laminated-cell body including the layer 31, in the cell-lamination direction. The laminated-cell body is fastened in the cell-lamination direction. The laminated-cell body is fixed on its outside by means of a fastening member 24 (e.g., a tension plate, a through bolt, or the like) extending in the cell-lamination direction and bolts 25 or nuts, whereby a fuel cell stack 23 is constituted.

The electrolytic membrane 11 is made of a solid-polymer ion exchange membrane. When the electrolytic membrane 11 is wet, hydrogen ions (protons) move therethrough. The electrolytic membrane 11 is a non-conductive membrane.

The catalytic layers 12, 15 are made of platinum (Pt), carbon (C), and an electrolyte. The diffusion layers 13, 16 have gas permeability and are made of carbon (C). The separators 18 are impervious to gas and water, have conductivity, and are generally made of any one of carbon (including graphite), a metal, and a conductive resin. In addition, the separators 18 separate fuel gas from oxidative gas, fuel gas from coolant, or oxidative gas from coolant, and form a passage through which electrons flow from the anode of a certain one of the cells to the cathode of another one of the cells adjacent thereto.

The fuel gas flow channel 27a is formed in the separator on one side of the MEA shown in FIG. 7, while the oxidative gas flow channel 27b is formed in the separator on the other side of the MEA shown in FIG. 7. The coolant flow channel 26 is provided for each cell or for a plurality of cells. In the example shown in FIG. 7, two cells are used to constitute one module, and the coolant flow channel 26 is provided for each module (i.e., for every two cells). In addition, according to the example shown in FIG. 7, the separators 18 are classified into two sorts of separators, that is, a separator 18A for separating one of fuel gas and oxidative gas from coolant and a separator 18B for separating fuel gas from oxidative gas. The MEA is also provided. A portion to which fuel gas is supplied is on one side of the MEA, while a portion to which oxidative gas is supplied is on the other side of the MEA. These portions constitute a power generation portion 33 of the fuel cell.

The separators 18 are generally quadrangular or substantially quadrangular in shape. It is not absolutely required, however, that the separators 18 be quadrangular in shape.

Each of the gas flow channels 27 (the fuel gas flow channel 27a and the oxidative gas flow channel 27b) is constructed of a fuel channel group in which a plurality of flow channel grooves are arranged in parallel or a flow channel in whose grooves a plurality of protrusions are formed. The flow channels are formed by partitions in such a manner as to serpentine in a direction within a separator plane, thus constituting so-called serpentine flow channels. A coolant manifold 28 (whose inlet side is denoted by 28a and whose outlet side is denoted by 28b), a fuel gas manifold 29 (whose inlet side is denoted by 29a and whose outlet side is denoted by 29b), and an oxidative gas manifold 30 (whose inlet side is denoted by 30a and whose outlet side is denoted by 30b) are formed in each of the separators 18 at its end portions that are opposed to each other with respect to the power generation portion 33. These manifolds 28, 29, and 30 are sealed from one another, so that different kinds of fluids do not mix with one another. Referring to FIG. 6A, feed/exhaust (outlet/inlet) pipes for fluids (water, fuel gas, and oxidative gas) are denoted by 34. These pipes 34 communicate with the manifolds 28, 29, and 30 respectively. As shown in FIG. 6, the fluids are supplied to or discharged from one end of the fuel cell stack 23 in the cell-lamination direction.

Figure 3:
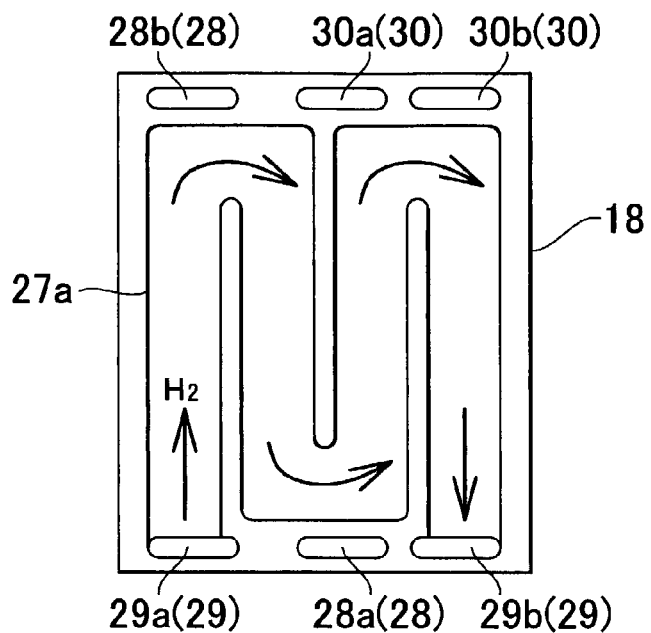
FIG. 3 is a front view of a face of a fuel cell which belongs to the fuel cell stack structure of the embodiment and in which a fuel gas flow channel for a separator is formed.
Figure 4:
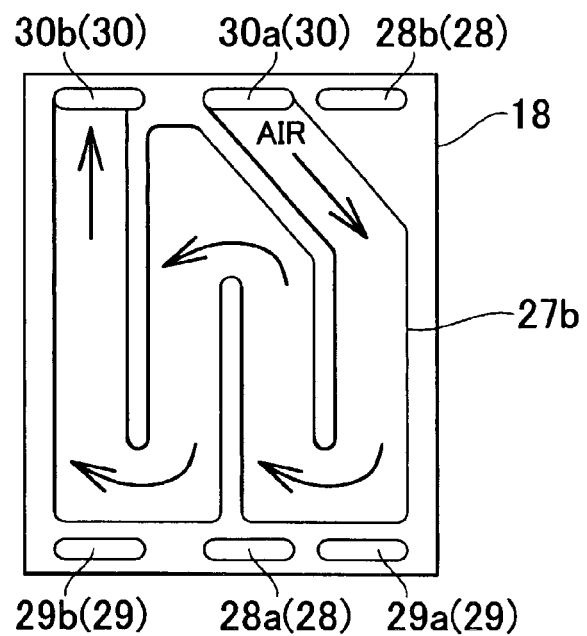
FIG. 4 is a front view of a face of a fuel cell which belongs to the fuel cell stack structure of the embodiment and in which an oxidative gas flow channel for a separator is formed.
Figure 5:
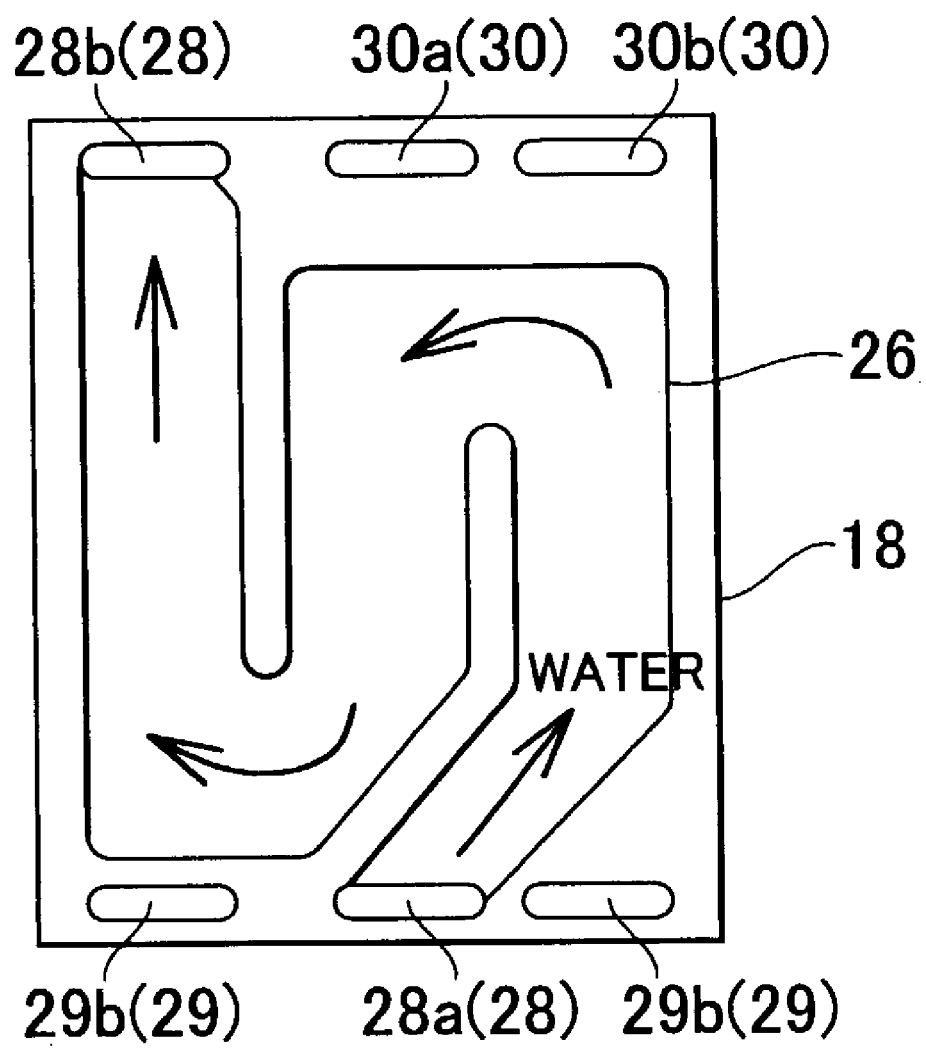
FIG. 5 is a front view of a face of a fuel cell which belongs to the fuel cell stack structure of the embodiment and in which a coolant flow channel for a separator is formed.

FIG. 3 shows an exemplary fuel gas flow channel pattern within the separator plane in the region of the laminated-cell body. FIG. 4 shows an exemplary oxidative gas flow channel pattern within the separator plane in the region of the laminated-cell body. FIG. 5 shows an exemplary coolant flow channel within the separator plane in the region of the laminated-cell body. It is to be noted, however, that the flow channel patterns are not limited to those shown in FIGS. 3 to 5.

As shown in FIG. 6A, a layer 31 which is irrelevant to power generation and in which a flow channel is formed is provided at least at a gas outlet/inlet end or either end (the layer 31 is provided at either end according to the example shown in FIG. 6A) of the laminated-cell body of the fuel cell stack 23 in the cell-lamination direction. The layer 31 is constructed, for example, of a dummy cell layer 31 that has a gas flow channel 36 but no MEA. The layer 31 is provided so as to trap impurities and condensate. If one layer alone does not suffice to trap impurities or condensate, a plurality of the same layers as the layer 31 may be provided. Detailed description will be made hereinafter with reference to an exemplary case where one layer is provided.

As shown in FIGS. 6B and 6C and FIGS. 1 and 2, the layer 31 which is irrelevant to power generation and in which the gas flow channel 36 is formed is composed of two layers 31a and 31b that are superimposed on each other with no MEA being interposed between them. The layers 31a and 31b are conductive as is the case with the separators 18, and are made, for example, of carbon plates. However, the carbon plates may be replaced with a combination of a plurality of metal plates or conductive resin plates.

The gas flow channel 36 is formed in one face of one of the two layers 31a and 31b, namely, the layer 31a. On the other hand, no flow channel is formed in the other layer 31b. The face of the layer 31a where the gas flow channel 36 is formed is brought into close contact with the other layer 31b where no gas flow channel is formed, whereby the layer 31 irrelevant to power generation is constituted. In the stack 23, the layer 31 irrelevant to power generation is disposed between the end cell of the laminated-cell body and the terminal 20.

Figure 1:
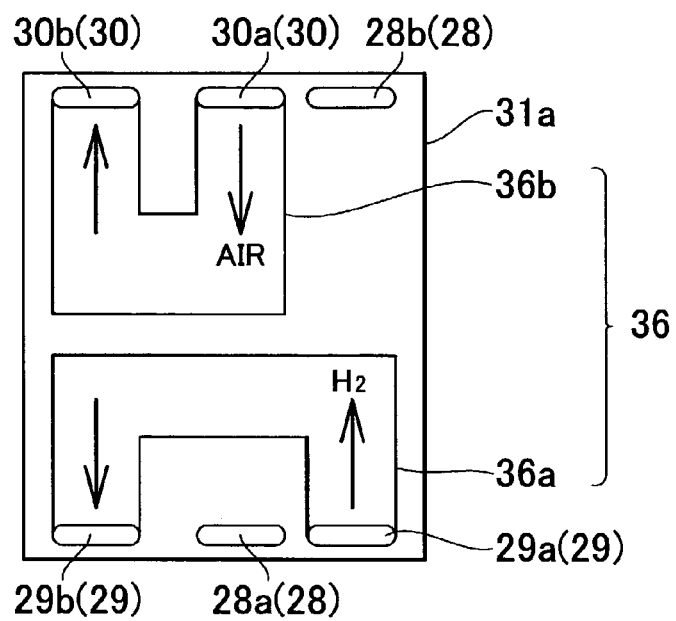
FIG. 1 is a front view of a layer which belongs to a fuel cell stack structure of an embodiment of the invention and in which gas flow channels are formed.
Figure 2:
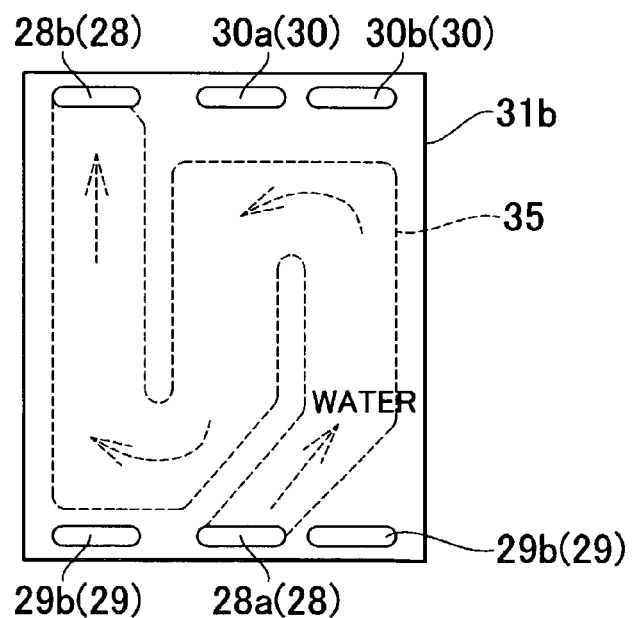
FIG. 2 is a front view of a layer which belongs to the fuel cell stack structure of the embodiment and in which no gas flow channel is formed, when viewed from the other side of a coolant flow channel.

Also, as shown in FIG. 1, both the fuel gas flow channel 36a and the oxidative gas flow channel 36b are formed on one face of the layer 31a. In the example shown in FIG. 1, the fuel gas flow channel 36 is formed in the first half region of one face of the layer 31a, and the oxidative gas flow channel 36b is formed in the second half region of the face. The fuel gas flow channel 36a and the oxidative gas flow channel 36b are sealed from each other, so that different kinds of gases do not mix with one another. The flow channel pattern of the fuel gas flow channel 36a is different from that of the fuel gas flow channel 27a formed in the cells. The flow channel pattern of the oxidative gas flow channel 36b is different from that of the oxidative gas flow channel 27b formed in the cells.

No gas flow channel is formed in one of the two layers 31a and 31b, namely, the layer 31b. One face of the layer 31b is brought into close contact with the layer 31a, whereas the other face of the layer 31b is not. On this face, preferably, a coolant flow channel 35 (indicated by broken lines in FIG. 2) constructed of a groove is formed. The flow channel pattern of the coolant flow channel 35 is identical with that of the coolant flow channel 26 formed in the separators 18 of the laminated-cell body.

As shown in FIG. 6B, the layer 31b in which no gas flow channel is formed is arranged by being brought into contact with the end cell of the laminated-cell body with the face where the coolant flow channel 35 is formed being directed toward the end cell of the laminated-cell body. At this moment, the coolant flow channel 35 of the layer 31b coincides with the coolant flow channel 26 formed in the separator 18 of the end cell. Thus, the flow channels 35, 26 cooperate with each other to constitute a composite coolant flow channel having the same cross-sectional area as the coolant flow channels of other cells.

In one of the two layers 31a and 31b, namely, the layer 31b, the gas flow channel is formed. The gas flow channel 36 is formed in one face of the layer 31b, whereas no gas flow channel is formed on the other face of the layer 31b. On this face (that is to come into close contact with the terminal 20) as well, preferably, the coolant flow channel 35 is formed. This is because the influence of external heat can be excluded.

An arrangement shown in FIG. 6C, which will be described hereinafter, may be adopted in place of the arrangement shown in FIG. 6B. The gas flow channels 36a and 36b are formed on one face of one of the two layers 31a and 31b, namely, the layer 31a. The layer 31a is disposed on the side of the laminated-cell body. The layer 31b in which no gas flow channel is formed is disposed on the side of the terminal 20. The flow channel 35 that is identical in flow channel pattern with the coolant flow channel 26 formed in the separators 18 of the laminated-cell body is formed in the face of the layer 31a which is to come into close contact with the laminated-cell body. The coolant flow channel 26 is formed also in the face of the layer 31b which is to come into close contact with the terminal 20.

Next, the operation of the aforementioned arrangement will be described. As is apparent from FIG. 6A, the layer (dummy cell) 31 which is irrelevant to power generation and in which the gas flow channel 36 is formed is provided in the laminated-cell body of the fuel cell stack 23 at least at the gas outlet/inlet end or at either end (the layer 31 is provided at either end according to the example shown in FIG. 6A) in the cell-lamination direction. Owing to the layer 31, therefore, substances coming from a gas feed line, that is, the condensate of humidified gas and impurities such as metal ions originating from the gas feed line and auxiliaries are trapped in the gas flow channels 36 (36a and 36b) of the dummy cell 31 while they flow therethrough. Thus, these substances are prevented from flowing into a power-generating cell of the laminated-cell body. As a result, the occurrence of a drop in voltage as caused heretofore in a cell, especially in an end cell (the end cell at the end of the gas feed side in particular) due to impurities and condensate is restricted. Since the dummy cell 31 is originally not intended for power generation, the voltage applied to the fuel cell does not drop even if the dummy cell 31 has been contaminated.

In addition, the layer (dummy cell) 31 which is irrelevant to power generation and in which the gas flow channel 36 is formed is provided at the end of the laminated-cell body. Therefore, the laminated-cell body is inhibited from being affected by external temperatures (low temperatures). Consequently, flooding can be inhibited from becoming likely to occur due to a drop in saturation vapor pressure resulting from a decrease in gas temperature. If flooding occurs, the supply of gases to the electrodes is hindered and a drop in voltage is caused. However, the occurrence of such a phenomenon is restricted by the invention.

Further, the gas flow channels 36a and 36b are formed on only one face of the layer 31a. In comparison with a case where the gas flow channels 36a and 36b are formed on both the faces of the layer 31a (the gas flow channel 36a is formed on one of the faces and the gas flow channel 36b is formed on the other), therefore, the thickness of the layer 31 can be reduced by the depth of one of the gas flow channels. Thus, the increase in stack length ascribable to the insertion of the dummy cell can be minimized.

What is claimed is:

1. A fuel cell stack structure comprising:
    a laminated-power generation cell body constructed by laminating a predetermined number of power generation fuel cells, each having a membrane-electrode assembly and a separator, the separator has a gas flow channel and a gas manifold which connects between gas flow channels of different power generation fuel cells of the predetermined number of power generation fuel cells, and feed and exhaust pipes being provided on only one-side end of the laminated-power generation cell body, gas is supplied to the laminated-power generation cell body through the feed pipe, and gas discharged from the laminated-power generation cell body flows through the exhaust pipe, and
    a gas flow channel layer having two faces which is provided outside of the laminated-power generation cell body, the gas flow channel layer being provided between the laminated-power generation cell body and a end plate, and communicates between the feed and exhaust pipes, the laminated-power generation cell body having a power generation portion;
    wherein the gas flow channel layer is a layer which has no membrane-electrode assemblies, which communicates between an inlet side and outlet side of a fuel gas manifold of the separator, and communicates between an inlet side and outlet side of a gas manifold of the separator,
    wherein both a fuel gas flow channel and an oxidative gas flow channel are formed in only one face of the gas flow channel layer, and
    wherein condensate originating from the feed pipe flows into the gas flow channel.

2. The fuel cell stack structure according to claim 1, wherein the power generation fuel cells are a solid-polyelectrolyte fuel cell.

3. The fuel cell stack structure according to claim 1, wherein the gas flow channel layer is provided at either end of the laminated-power generation cell body.

4. The fuel cell stack structure according to claim 1, wherein the gas flow channel layer having no membrane-electrode assemblies is composed of a plurality of layers.

5. The fuel cell stack structure according to claim 1, wherein the fuel gas flow channel and the oxidative gas flow channel are not in contact with a membrane-electrode assembly.

6. The fuel cell stack structure according to claim 1, wherein a coolant flow channel is formed in one face of the gas flow channel layer having no membrane-electrode assemblies.

7. The fuel cell stack structure according to claim 1, wherein the gas flow channel layer is conductive.

8. The fuel cell stack structure according to claim 1, wherein the gas flow channel layer is made of carbon.

9. The fuel cell stack structure according to claim 1, wherein the gas flow channel layer traps condensate of humidified gas and impurities which are flowing from the feed pipe into the gas flow channel layer.

10. The fuel cell stack structure according to claim 2, wherein the power generation fuel cells are a solid polyelectrolyte fuel cell having a platinum catalyst.

11. The fuel cell stack structure according to claim 1, wherein the feed pipe includes inlet and outlet gas feed lines fluidly communicating with an upstream side of the power generation fuel cells.

12. A fuel cell stack structure comprising:
    a laminated-power generation cell body constructed by laminating a predetermined number of power generation fuel cells, which has a membrane electrode assembly and a separator, and feed and exhaust pipes being provided on only one-side end of the laminated-power generation cell body, gas is supplied to the laminated-power generation cell body through the feed pipe, and gas is discharged from the laminated-power generation cell body flow through the exhaust pipe; and
    a gas flow channel having two faces which is provided between a end plate and the laminated-power generation cell body, the gas flow channel communicates between the feed and exhaust pipes;
    wherein both a fuel gas flow channel and an oxidative gas flow channel are formed in only one face of the gas flow channel layer, and
    wherein condensate originating from the feed pipe flows into the gas flow channel.

13. The fuel stack structure according to claim 12, wherein the gas flow channel connects the inlet gas manifold and the outlet gas manifold outside of the laminated power generation cell body.

14. The fuel stack structure according to claim 12, wherein the gas flow channel is formed in the direction of a plane of the membrane electrode assembly of the power generation fuel cells.

* * * * *

UNITED STATES PATENT AND TRADEMARK OFFICE
CERTIFICATE OF CORRECTION

PATENT NO. : 7,588,851 B2                                        Page 1 of 1
APPLICATION NO. : 10/435388
DATED : September 15, 2009
INVENTOR(S) : Yasuyuki Asai et al.

It is certified that error appears in the above-identified patent and that said Letters Patent is hereby corrected as shown below:

| Column | Line | |
|--------|------|---|
| 8 | 27 | After "and gas" delete "is". |
| 8 | 29 | Change "body flow" to --body flows--. |

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,588,851 B2
APPLICATION NO. : 10/435388
DATED : September 15, 2009
INVENTOR(S) : Asai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Twenty-first Day of September, 2010

David J. Kappos
*Director of the United States Patent and Trademark Office*